US009047231B2

(12) United States Patent
Hsu et al.

(10) Patent No.: US 9,047,231 B2
(45) Date of Patent: Jun. 2, 2015

(54) APPARATUS SYSTEM AND METHOD FOR DETERMINISTICALLY TRANSFERRING DATA BY REBOOTING TO A DATA TRANSFER KERNEL

(75) Inventors: Yu-Cheng Hsu, Tucson, AZ (US); Richard Anthony Ripberger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 3670 days.

(21) Appl. No.: 10/686,878

(22) Filed: Oct. 16, 2003

(65) Prior Publication Data

US 2005/0086461 A1 Apr. 21, 2005

(51) Int. Cl.
*G06F 21/00* (2013.01)
*G06F 11/14* (2006.01)

(52) U.S. Cl.
CPC .................................. *G06F 11/1441* (2013.01)

(58) Field of Classification Search
USPC ............................................................ 713/2
See application file for complete search history.

(56) References Cited

U.S. PATENT DOCUMENTS

| | | | | |
|---|---|---|---|---|
| 5,291,600 A | 3/1994 | Lutz et al. | ...................... | 395/700 |
| 5,317,752 A | 5/1994 | Jewett et al. | ................... | 395/750 |
| 6,567,899 B2 * | 5/2003 | Ghosh et al. | .................. | 711/156 |
| 6,854,054 B1 * | 2/2005 | Kavanagh | .......................... | 713/2 |
| 6,948,099 B1 * | 9/2005 | Tallam | ............................. | 714/38 |
| 6,965,989 B1 * | 11/2005 | Strange et al. | ..................... | 713/1 |
| 7,085,886 B2 | 8/2006 | Hsu et al. | | |
| 7,124,322 B1 * | 10/2006 | Backman | ........................ | 714/15 |
| 7,231,547 B2 * | 6/2007 | Moiroux et al. | ................ | 714/24 |
| 2003/0217299 A1 * | 11/2003 | Neuman et al. | ............... | 713/300 |

FOREIGN PATENT DOCUMENTS

WO    WO 02/086732    10/2002    ............. G06F 12/16

* cited by examiner

*Primary Examiner* — Shewaye Gelagay
*Assistant Examiner* — Carlton Johnson
(74) *Attorney, Agent, or Firm* — Kunzler Law Group

(57) ABSTRACT

A data saving device, system, and method rapidly and deterministically saves data of a computer system. The device may mark data that must be saved when the computer is shut down. In certain embodiments, a boot control module detects a condition requiring a rapid deterministic data saving operation, such as a power failure and reboots the computer, deterministically terminating all existing processes. Additionally, the boot control module loads a data transfer kernel in place of a standard operating kernel used for normal operation. The data transfer kernel supports a set of processes exclusively dedicated to saving data. The data transfer kernel configures the computer and storage devices for the data transfer and saves the marked data with a minimum of interruptions from other processes. Also, the data transfer kernel may shut down the computer and the storage devices after transferring data.

16 Claims, 6 Drawing Sheets

330

APPARATUS SYSTEM AND METHOD FOR DETERMINISTICALLY TRANSFERRING DATA BY REBOOTING TO A DATA TRANSFER KERNEL

BACKGROUND OF THE INVENTION

1. The Field of the Invention

The invention relates to methods, devices, and systems for saving data during a power failure. Specifically, the invention relates to methods, devices, and systems for rebooting a computer with a kernel dedicated to saving data to storage devices.

2. The Relevant Art

Computer systems such as server farms or mainframe computers typically process large amounts of data. Data normally resides on non-volatile mass storage devices such as hard disk drives or tape drives. Data is typically transferred from non-volatile mass storage to volatile memory within a computer system for processing. Recent transaction data may also reside in the volatile memory of the computer.

Data residing in volatile memory is vulnerable to loss if the computer loses power. The cost of the data loss may be very high. To protect against data loss, computers are often provided with back-up power supplies. Back-up power supplies deliver uninterrupted power that allows a computer to continue operation. Long-term back-up supplies can power a computer until the computer is safely shut down or regular operating power is restored.

Providing long-term back-up power may be impractical in a data processing facility that maintains a large number of computers. As a result, short-term back-up power supplies storing substantial amounts of power are often used. Short-term back-up power supplies are designed to supply power until a computer can safely be shut down. Data residing in the computer's volatile memory must be transferred to non-volatile memory before short-term power is exhausted. Rapid data transfers reduce the risk of permanent data loss and minimize the cost of back-up power supplies by shortening the time a back-up supply must provide power when shutting down a computer.

Even when a back-up power supply is available, power failures may disrupt communications, peripherals, or ancillary systems, and prevent computer processes from operating normally. In such conditions, processes are susceptible to completion delays and faults that may result in failure to return control to the operating kernel. Furthermore, as processes delay or stall, computer operation may become increasingly unstable, and the computer's standard operating kernel may ultimately stall, resulting in lost data, even though the computer was continuously powered with back-up power.

A data saving process that saves data during a power failure or other shutdown operation typically runs under the computer's standard operating kernel. The data saving process may be slowed by existing processes that were already running under the standard operating kernel before the power failure occurred. The existing processes may stall before the data transfer can be completed. Existing processes also take processing power and communications bandwidth from the critical data saving process, and can potentially cause unacceptable non-deterministic delays during the data transfer process. Even shutting down the existing processes can be unpredictable if power failure conditions prevent normal process termination. The delays of existing processes put the computer's ability to rapidly and predictably save data during a power failure shutdown at risk.

What is needed is a device, system, and method of configuring a computer to save data as rapidly as possible during a computer system shutdown. What is more particularly needed is a device, system, and method of deterministically terminating existing processing and configuring a computer and related subsystems to save data from volatile storage to non-volatile storage.

SUMMARY OF THE INVENTION

The various elements of the present invention have been developed in response to the present state of the art, and in particular, in response to the problems and needs in the art that have not yet been fully solved by currently available means and methods for saving data during a computer system shutdown. Accordingly, the present invention provides an improved method, device, and system for rapidly and deterministically saving data to non-volatile storage under selected conditions such as a power failure.

In one aspect of the present invention, an apparatus for deterministically saving data from a computer is presented. The computer includes a processor and memory. The processor loads data from a storage device into memory. During normal computer operation, blocks of data in memory may be marked for transfer during a rapid, deterministic data save operation.

In one embodiment, a boot control module detects a condition such as a power failure requiring a rapid, deterministic data save procedure. To initiate the data save operation, the boot control module reboots the processor, resetting the processor to an initial state and initiating the reloading of a software kernel. All previously existing processes, including the standard operating kernel, are deterministically terminated by the reboot. The boot control module boots the processor with a special data transfer kernel instead of the standard operating kernel.

The data transfer kernel may be configured to exclusively support processes and interrupts required to complete the data save procedure. In one embodiment, the data transfer kernel configures the computer modules required to transfer data in a rapid deterministic manner. The data transfer kernel may also configure non-volatile storage devices to receive data.

In certain embodiments, the data transfer kernel loads a data transfer process. The data transfer process saves data blocks from the computer to the storage devices. In one embodiment, only marked data is saved and marked data blocks may not be overwritten. Unmarked data blocks are not saved and may be overwritten. In another embodiment, only unmarked data is saved. Saving only unmarked data facilitates backward compatibility with processes that do not mark data.

In another aspect of the present invention, a method for rapidly saving data is presented. The method operates on a computer system, identifying and marking data that must be saved during a rapid, deterministic data save operation. The method further detects one or more conditions that may require a data save operation. If a data save operation is required, the method reboots the computer's processor with a data transfer kernel, and all previously existing processes are terminated. The method for rapidly saving data may configure the computer and external storage devices for a data save operation. The data transfer kernel saves data to the storage devices. In one embodiment, the method only saves marked data.

Various elements of the present invention are combined into a system for rapidly and deterministically saving data. The system includes a processor and memory. The system also includes one or more storage devices. In one embodiment, the memory is volatile and the storage devices are non-volatile. During normal operation, the processor may mark blocks of data for transfer during a rapid, deterministic data save operation. In the event of a power failure or other condition requiring that the computer's data be saved, the contents of the volatile memory are saved to the non-volatile storage device.

The system includes a boot control module. The boot control module detects conditions such as power failure that require a data save operation from the memory to the storage devices. The boot control module reboots the system processor. Rebooting the processor terminates all the previously existing processes that could slow or stall the computer's operation. The boot control module loads a data transfer kernel. The data transfer kernel exclusively supports hardware and software processes required for a rapid, deterministic data save procedure.

The data transfer kernel rapidly saves data from the memory to the storage device. In certain embodiments, only marked data is saved. In one embodiment, no unneeded processes or hardware interrupts are loaded or serviced by the data transfer kernel, and so unneeded processes and hardware cannot interfere with the data transfer. In one embodiment, the data transfer kernel shuts down the system when data transfer is complete.

The boot control module also detects a normal system boot. During normal operation, the boot control module boots the system with the standard operating kernel. In one embodiment, the standard operating kernel and the data transfer kernel are stored within the boot control module.

The present invention facilitates rapid, deterministic data save operations from volatile computer memory to non-volatile storage devices while protecting against process instability or stalling. The present invention further decreases the time required to save data prior to shutting down a computer system. A rapid, deterministic data save procedure significantly reduces the probability of losing data. The present invention also reduces the cost of backup power supplies needed to maintain computer functions during power failure until the computer can be shut down. These and other features and advantages of the present invention will become more fully apparent from the following description and appended claims, or may be learned by the practice of the invention as set forth hereinafter.

BRIEF DESCRIPTION OF THE DRAWINGS

In order that the manner in which the advantages of the invention are obtained will be readily understood, a more particular description of the invention briefly described above will be rendered by reference to specific embodiments thereof, which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Many of the functional units described in this specification have been labeled as modules, in order to more particularly emphasize their implementation independence. For example, modules may be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. For example, a module of executable code could be a single instruction, or many instructions, and may even be distributed over several different code segments, among different programs, and across several memory devices.

Modules may also be implemented in hardware as electronic circuits comprising custom VLSI circuitry, off-the-shelf semiconductors such as logic chips, transistors, or other discrete components. A module may also be implemented in programmable hardware devices such as field programmable gate arrays, programmable array logic, programmable logic devices or the like.

Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
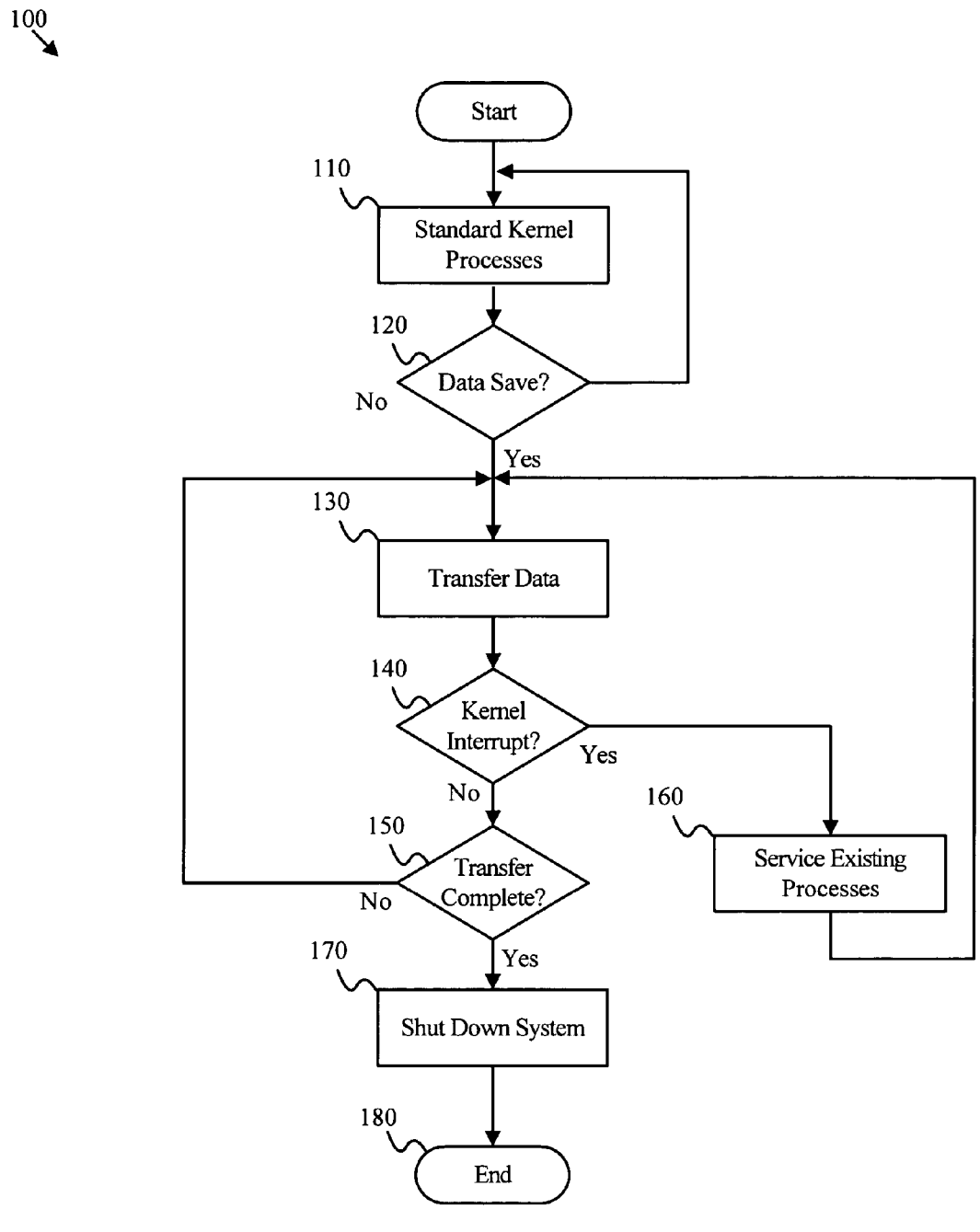
FIG. 1 is a flow chart diagram illustrating a data save method of the prior art.

FIG. 1 is a flow chart diagram illustrating one embodiment of a prior art data save method 100. The method 100 includes a standard kernel processes step 110, a data save test 120, a transfer data step 130, a kernel interrupt test 140, a transfer complete test 150, a service existing processes step 160, and a shut down system step 170, and an end step 180.

The standard kernel processes step 110 represents normal operation of a computer, including servicing one or more existing processes. The data save test 120 detects a condition that requires the computer's data to be saved, such as a power failure. If a data save operation is not needed, the method 100 loops to the standard kernel processes step 110. If a data save operation is needed, the method 100 proceeds to the transfer data step 130.

The transfer data step 130 transfers a portion of data from the computer to a storage device. In one embodiment, the transfer data step 130 saves data from a volatile computer memory module to a non-volatile storage device. The kernel interrupt test 140 determines if the standard operating kernel must service an existing process. The existing processes were previously serviced during the standard kernel processes step 110.

If the kernel interrupt test 140 determines one or more existing processes must be serviced, the method 100 loops to the transfer data step 130 via the service existing processes step 160. The service existing processes step 160 services the existing processes executing on the system. During the service existing processes step 160, the computer is susceptible to unpredictable delays or hanging. If the kernel interrupt test 140 determines no software or hardware processes must be serviced, the method 100 proceeds to the transfer complete test 150.

The transfer complete test 150 determines if all data has been transferred from the computer. If some data remains to be transferred, the method 100 loops to the transfer data step 130. If all data has been transferred, the method 100 proceeds to the shut down system step 170. The shut down system step 170 shuts down the computer. The shut down system step 170 may also shut down the storage device. The end step 180 terminates the method 100.

The data save method 100 exposes a data save operation to failure due to existing processes that may stall the computer or delay completion of the data save operation. In addition, terminating existing processes as part of the method 100 requires processing and increases the risk that valuable data may be lost if the computer stalls or is powered down prematurely.

Figure 2:
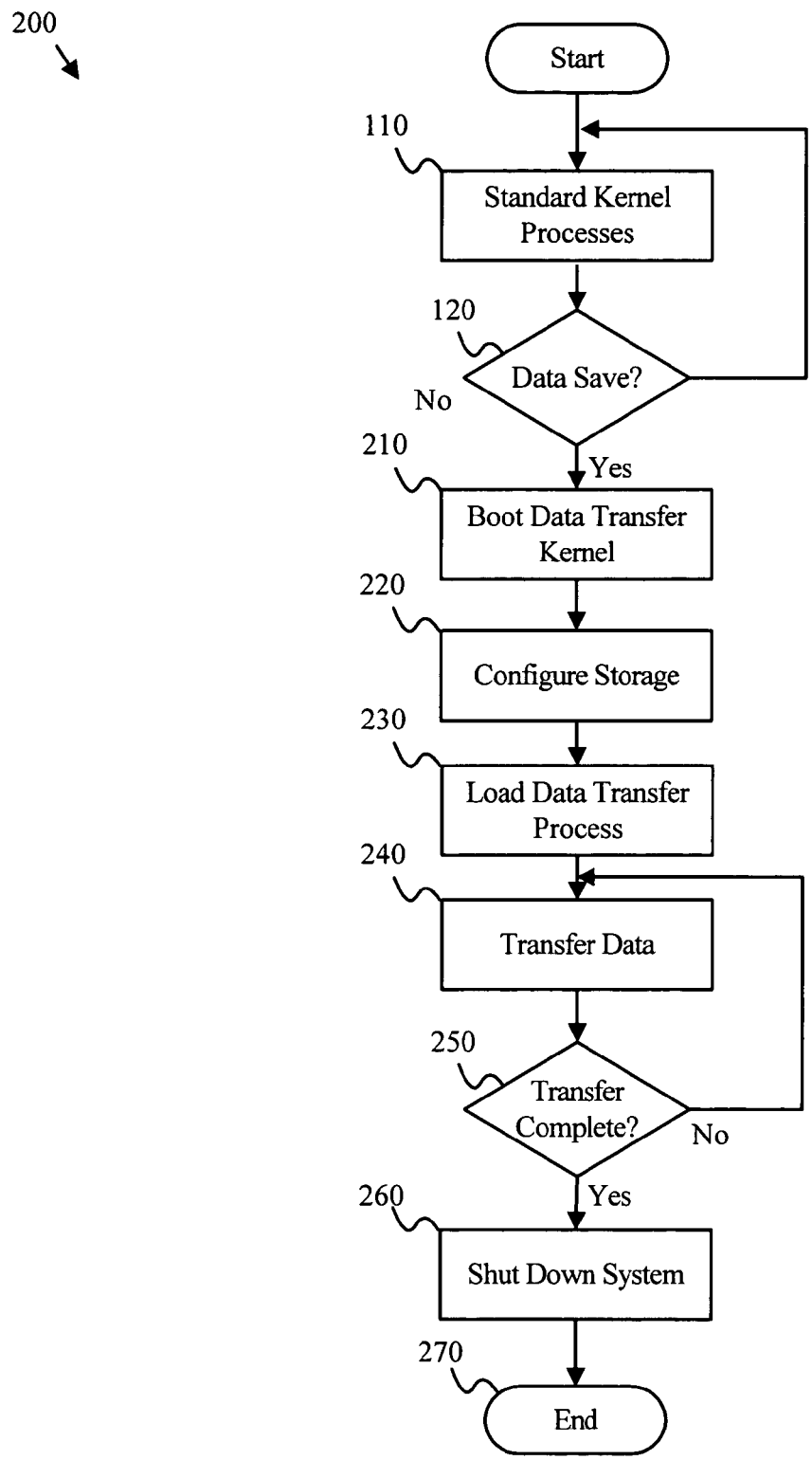
FIG. 2 is a flow chart diagram illustrating one embodiment of a data save method of the present invention.

FIG. 2 is a flow chart illustrating one embodiment of a data save method 200 of the present invention. The depicted data save method 200 includes a standard kernel processes step 110, a data save test 120, a boot data transfer kernel step 210, a configure storage step 220, a load data transfer process step 230, a transfer data step 240, a transfer complete test 250, a shut down system step 260, and an end step 270. The method 200 terminates previously existing processes that could delay a data save operation, and rapidly and deterministically saves data from the computer to a storage device. Although for purposes of clarity the steps of the data save method 200 are depicted in a certain sequential order, execution within an actual system may be conducted in parallel and not necessarily in the depicted order.

The standard kernel processes step 110 in one embodiment performs a computer's normal operations, i.e., servicing software and hardware processes. In one embodiment, the computer marks data that must be saved during a rapid, deterministic data save procedure. Marking may include setting flag bits in a data line or file header. The data save test 120 detects a condition, such as a power failure, that requires computer data to be rapidly and deterministically saved. If a data save operation is not needed, the method 200 loops to the standard kernel processes step 110. If a data save operation is needed, the method 200 proceeds to the boot data transfer kernel step 210.

The boot data transfer kernel step 210 in one embodiment reboots the computer's processor. Rebooting the processor deterministically terminates all existing processes. Consequently, the existing processes have no opportunity to stall or run for an excessive time. In addition, the boot data transfer kernel step 210 further loads a data transfer kernel. The data transfer kernel is distinguished from the standard operating kernel used in normal operation by supporting only a limited set of software and hardware processes that are required to save data.

The configure storage step 220 in one embodiment configures one or more storage devices to receive saved data from the computer. The load data transfer process step 230 loads a data transfer process running under the data transfer kernel. The data transfer process is configured to rapidly save data from the computer to the storage devices with minimal interruptions from other processes. The transfer data step 240 saves data from the computer to the storage devices. The configure storage step 220, the load data transfer process step 230, and the data transfer step 240 proceed deterministically, without delays caused by other processes. In one embodiment, the transfer data step 240 saves only data that was marked for a rapid, deterministic data save operation. In another embodiment, the transfer data step 240 saves only unmarked data.

The transfer complete test 250 in one embodiment determines if all data has been saved from the computer. In one embodiment, the transfer complete test 250 determines if all marked data has been saved. If data remains to be saved, the method 200 loops to the transfer data step 240. If all data has been saved, the method 200 proceeds to the shut down system step 260. The shut down system step 260 shuts down the computer. In one embodiment, the shut down system step 260 also shuts down the storage devices.

The end step 270 terminates the method 200. The method 200 reduces the risk of lost data during a data save operation by terminating processes that may stall or delay computer operation and by using a dedicated data transfer kernel to save data.

Figure 3:
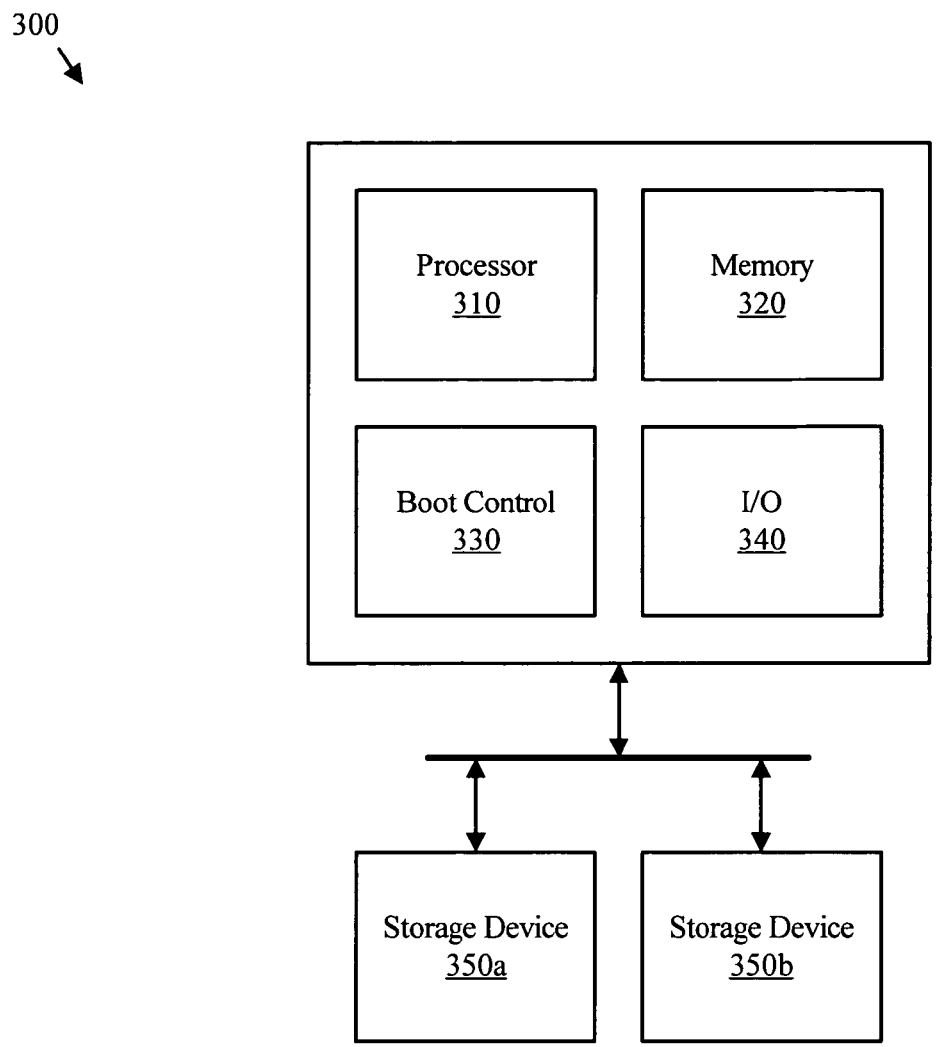
FIG. 3 is a block diagram illustrating one embodiment of a computer system of the present invention.

FIG. 3 is a block diagram illustrating one embodiment of a computer system 300 of the present invention. The computer system 300 may be used in conjuction with the method 200 of FIG. 2 or may be conducted independent thereof. In the depicted embodiment the system 300 includes a processor module 310, a memory module 320, a boot control module 330, an I/O module 340, and one or more storage devices 350. The system 300 supports rebooting the processor module 310 to terminate existing processes and loading a data transfer kernel. The data transfer kernel rapidly and deterministically saves data to the storage devices 350.

The processor module 310 in one embodiment manipulates instructions and data stored in the memory module 320. Additionally, the processor module 310 preferably further instructs the I/O module 340 to store and load instructions and data to and from the storage devices 350. In one embodiment, the processor module 310 marks selected data in the memory module 320 for saving during a rapid, deterministic data save operation.

The boot control module 330 in one embodiment boots the processor module 310 with a standard operating kernel during a normal boot operation. The standard operating kernel manages operations of the processor module 310, loading and servicing one or more processes. The boot control module 330 preferably also detects conditions requiring a rapid, deterministic data save operation. If a data save operation is required, the boot control module 330 reboots the processor module 310, terminating all processes including the standard operating kernel.

The boot control module 330 boots the processor module 310 with a data transfer kernel rather than the standard operating kernel. In one embodiment, the data transfer kernel protects marked data in the memory module 320 from being overwritten. The data transfer kernel may configure the processor module 310, the memory module 320, and the I/O module 340 to perform a rapid, deterministic data save operation. The data transfer kernel may also configure the storage devices 350 to receive saved data.

The data transfer kernel may load a data transfer process onto the processor module 310. The data transfer process saves data from the memory module 320 to the storage devices 350. In one embodiment, the data transfer process saves only marked data. The data transfer kernel may shut down the system 300 after saving all data.

The system 300 thus supports a rapid, deterministic data save operation by rebooting the processor module 310 to terminate existing processes that may stall or delay the function of the system 300. The boot control module 330 loads the data transfer kernel to perform the data save operation without interruptions from other processes, reducing the risk of losing valuable data.

Figure 4:
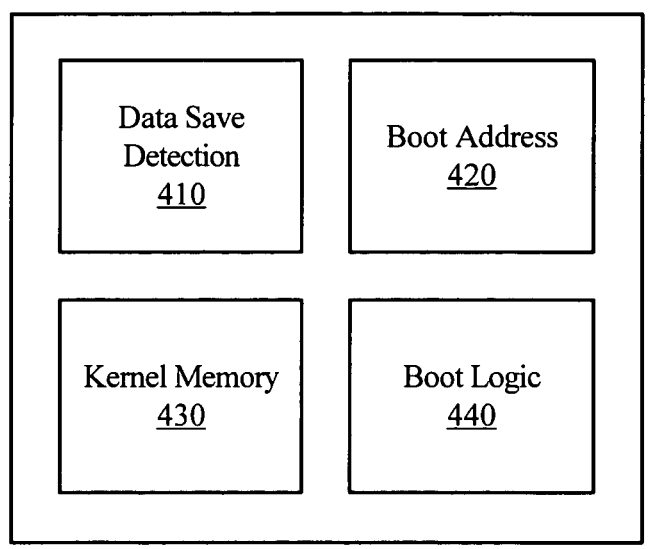
FIG. 4 is a block diagram illustrating one embodiment of a boot control module of the present invention.

FIG. 4 is a block diagram illustrating in greater detail one embodiment of a boot control module 330 of FIG. 3. The boot control module 330 in the depicted embodiment includes a data save detection module 410, a boot address module 420, a kernel memory module 430, and a boot logic module 440. The boot control module 330 preferably reboots a processor module 310 with the data transfer kernel in response to predetermined conditions such as a power failure, while loading the standard operating kernel during normal operational restarts.

The data save detection module 410 in one embodiment detects predetermined conditions requiring a rapid, deterministic data save procedure. The boot logic module 440 in one embodiment reboots the processor module 310 if a data save operation is required. Additionally, the boot logic module 440 preferably directs the boot address module 430 to provide the processor module 310 with the boot address of the data transfer kernel.

The processor module 310 in one embodiment loads the data transfer kernel from the kernel memory 430. During a normal operational restart, the boot logic module 440 directs the boot address module 430 to provide the processor module 410 with the address of the standard operating kernel. The processor module 310 preferably loads and executes the standard operating kernel. The boot control module 330 preferably supports loading the standard operating kernel during normal operational restarts while enabling a dedicated data transfer kernel to be loaded under predetermined conditions to facilitate a rapid, deterministic data save operation.

Figure 5:
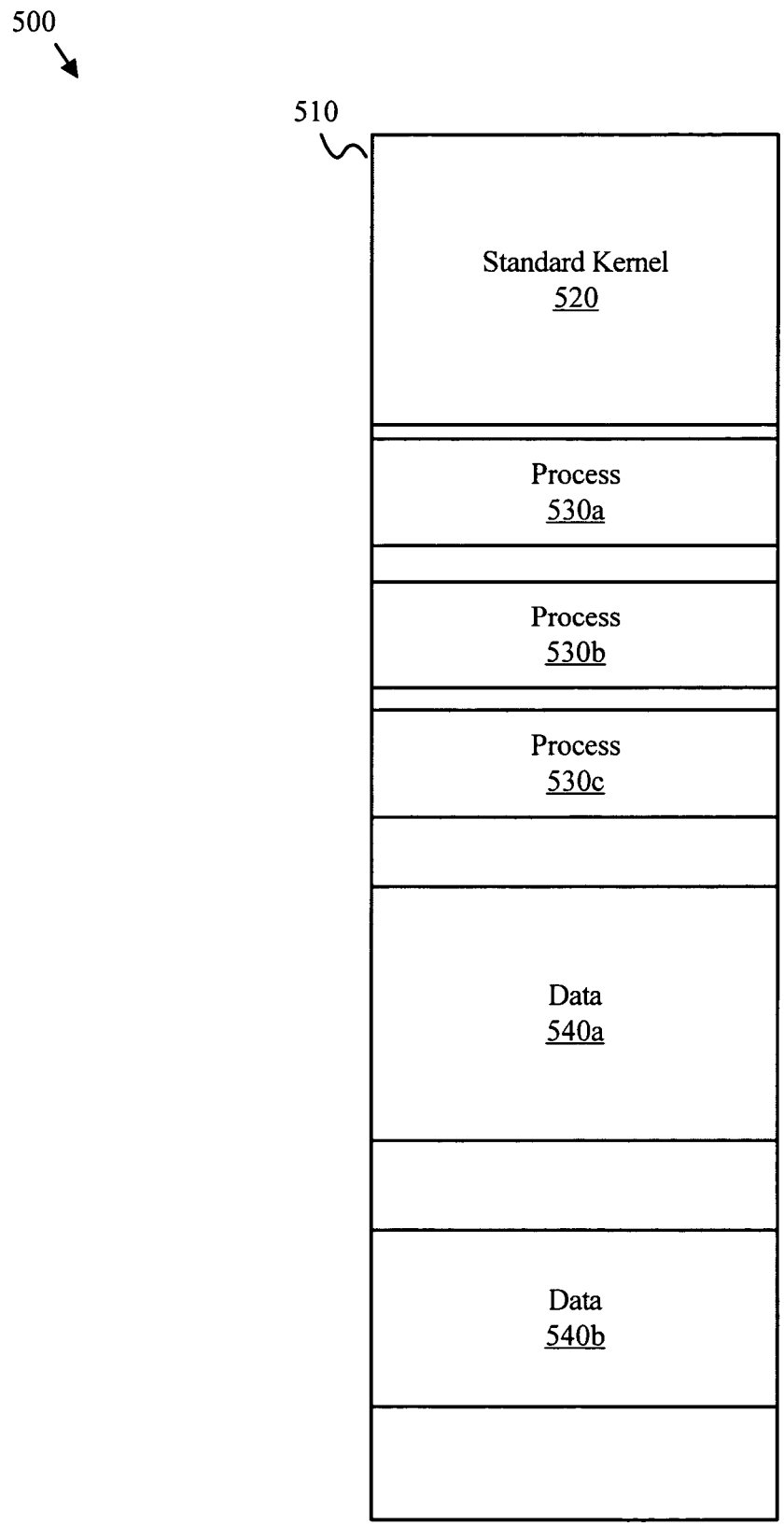
FIG. 5 is a block diagram of one embodiment of an initial memory map of the present invention.

FIG. 5 is a block diagram of one embodiment of an initial memory map 500 of the present invention. The memory map 500 may be used in conjunction with the method 200 and apparatus 300 of FIGS. 2-4 or may be implemented independently thereof. The memory map 500 includes an address space 510, a standard operating kernel 520, one or more processes 530, and one or more data blocks 540. The memory map 500 illustrates the location of data and processes in the memory module 320 of the computer system 300.

The address space 510 represents all available memory addresses of the memory module 320. The standard kernel 520 occupies a portion of the memory module 320. One or more processes 530 also reside in the memory module 320. In normal operation, the standard operating kernel 520 services the processes 530. The processes 530 utilize the data 540 stored on the memory module 320. In one embodiment, the computer system 300 marks data 540 for saving during a rapid, deterministic data save operation.

Figure 6:
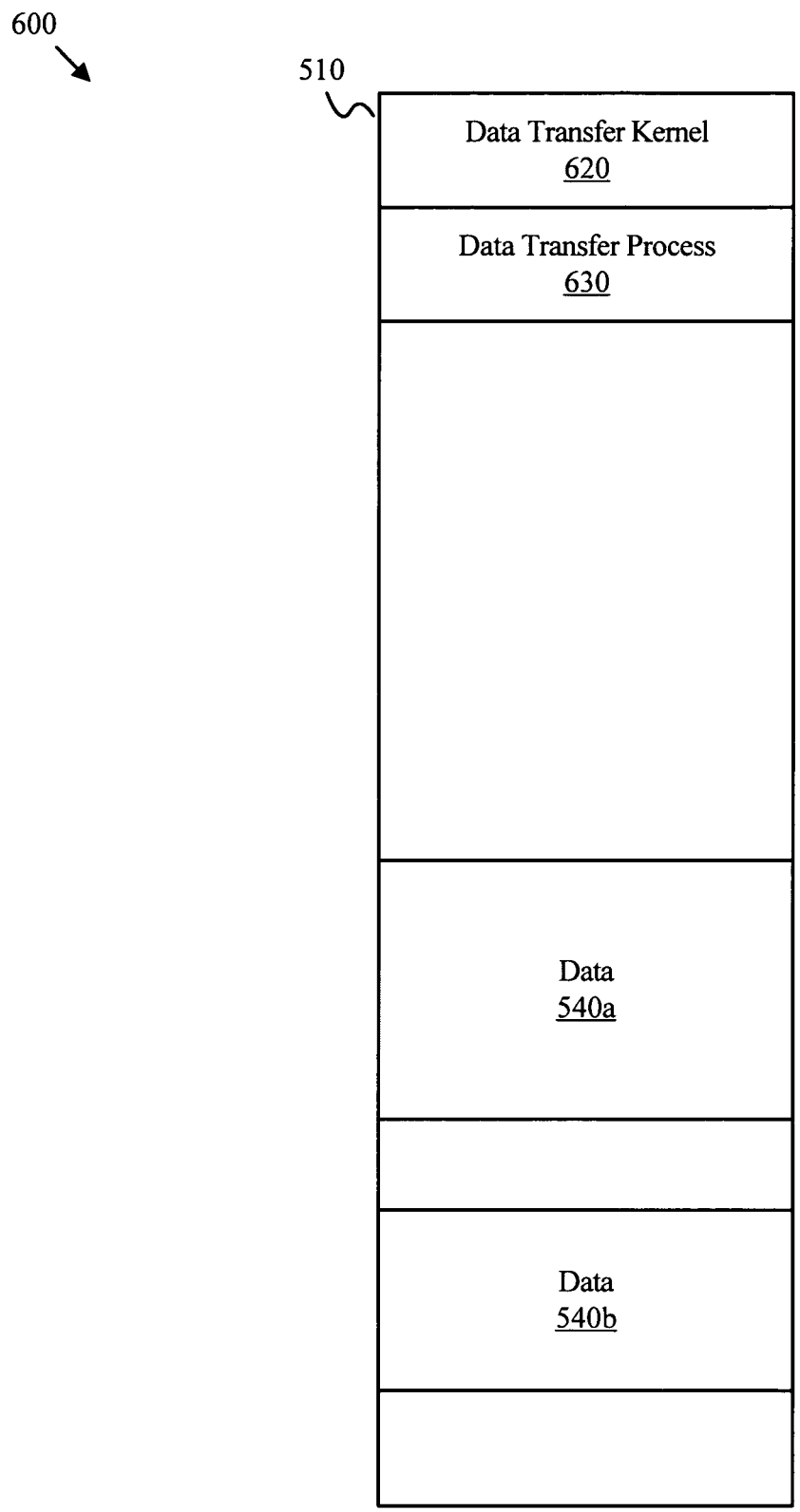
FIG. 6 is a block diagram of one embodiment of a data transfer memory map of the present invention.

FIG. 6 is a block diagram of one embodiment of a data transfer memory map 600 of the present invention. The memory map 600 may be used in conjunction with the method 200 and apparatus 300 of FIGS. 2-4, or may be implemented independent thereof. The memory map 600 includes an address space 510, a data transfer kernel 620, a data transfer process 630, and one or more data blocks 540. The memory map 600 illustrates the location of data 540 and processes in the memory module 320 of the computer system 300 after initiation of a rapid, deterministic data save procedure.

In one embodiment the boot control module 320 reboots the processor module 310 with the data transfer kernel 620 when a rapid, deterministic data save procedure is required or requested. The reboot immediately terminates the standard operating kernel 520, and the existing processes 530. In one embodiment, the data transfer kernel 620 maintains the integrity of the marked data 540, preventing the marked data 540 from being overwritten.

The data transfer kernel 620 in one embodiment configures the processor 310 and the storages devices 350 to transfer data. In one embodiment, the data transfer kernel 620 loads and services the data transfer process 630. The data transfer process 630 may save data 540 from the memory module 320 to the storage devices 350. In one embodiment, the data transfer process 630 saves only marked data 540. In another embodiment, terminating existing process 530 protects the computer losing data by eliminating the risk that existing processes 530 will stall or delay data saving operations.

The present invention deterministically saves data when a computer needs to rapidly shut down, such as during a system power failure. The present invention further mitigates against computer instability or stalling by immediately terminating unneeded processes. The present invention also decreases the time required to transfer data from a computer system in order to shut down the computer system, reducing the risk of data loss and the cost of backup power supplies.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for rapidly, deterministically transferring data, the apparatus comprising:
a processor for processing the data;
a volatile memory for storing the data;
wherein the standard operating kernel for marking the data in the memory to be saved by the data transfer kernel during the data save operation; and
a boot control module for booting the processor with a standard operating kernel under a normal operating condition and deterministically for terminating all existing processes and the standard operating kernel for rebooting the processor with a data transfer kernel in response to an abnormal operating condition that threatens a loss of the data in the volatile memory, wherein the reboot occurs without a loss of the data within the volatile memory;
wherein the data transfer kernel exclusively supports devices, operations, and processes required to save data; and
the data transfer kernel for loading in the volatile memory, executing the data save operation, and not loading and exiting other processes in the volatile memory in response to rebooting the processor with the data transfer kernel, the data save operation saves the data in the volatile memory to a storage device, and shuts down the processor in response to completing the data save operation.

2. The apparatus of claim 1, wherein the data save operation is selected from the group consisting of a storage configuration operation, a transfer process loading operation, a data transfer operation, and a system shutdown operation.

3. The apparatus of claim 1, further comprising a memory module comprising data bits for marking data to be saved during the data save operation.

4. The apparatus of claim 1, the data transfer kernel configuring the storage device for the data save operation.

5. The apparatus of claim 1, the data transfer kernel conducting a power down procedure.

6. An apparatus for rapidly, deterministically transferring data to a storage device, the apparatus comprising:
- a storage device non-volatilely for storing the data;
- a data transfer kernel for supporting data saving operations;
- wherein the standard operating kernel for marking the data in the memory to be saved by the data transfer kernel during the data save operation; and
- a computer in communication with the storage device, the computer deterministically for terminating all existing processes by loading the data transfer kernel during a reboot procedure in response to an abnormal operating condition that threatens the loss of data in a volatile memory, wherein the reboot procedure occurs without a loss of the data within the volatile memory;
- wherein the data transfer kernel exclusively supports devices, operations, and processes required to save data; and
- the data transfer kernel for loading a data save operation in the volatile memory executes the data save operation, and not loading and executing other processes in the volatile memory in response to rebooting the computer with the data transfer, the data save operation saves the data in the volatile memory to the storage device, and shuts down the computer in response to completing the data save operation.

7. The apparatus of claim 6, the data transfer kernel exclusively supporting devices and processes required to save data to the storage device.

8. An apparatus for rapidly, deterministically saving data, the apparatus comprising:
- means for processing data;
- means for volatilely storing the data; and
- means for booting the processing means with a standard operating kernel under a normal condition and deterministically terminate all existing processes by rebooting the processing means with a data transfer kernel without a loss of data in the volatile storing means in response to the abnormal operating condition, the data transfer kernel loads a data save operation in the volatile storing means, wherein the standard operating kernel for marking the data in the memory to be saved by the data transfer kernel during the data save operation, wherein the data transfer kernel exclusively supports devices, operations, and processes required to save data, execute the data save operation, and not loading and executing other processes in the volatile storing means in response to rebooting the processing means with the data transfer kernel, the data save operation saves the data to a non-volatile storage, and the data transfer kernel shuts down the processing means in response to completing the data save operation.

9. The apparatus of claim 8, further comprising means for configuring the non-volatile storage for the data save operation.

10. A system for rapidly, deterministically saving data to a storage device, the system comprising:
- a processor for processing data;
- a memory volatilely for storing the data;
- a storage device non-volatilely for storing the data;
- wherein the standard operating kernel for marking the data in the memory to be saved by the data transfer kernel during the data save operation; and
- a boot control module for booting the processor module with a standard operating kernel under a normal operating condition and deterministically terminates all existing processes and the standard operating kernel by rebooting the processor with a data transfer kernel in response to an abnormal operating condition that threatens the loss of the data in the memory, wherein the reboot occurs without a loss of the data in the memory;
- wherein the data transfer kernel exclusively supports devices, operations, and processes required to save data; and
- the data transfer kernel for loading a data save operation in the volatile memory executing the data save operation, and not loading and executing other processes in the volatile memory in response to rebooting the processor with the data transfer kernel, the data save operation saves the data in the memory to the storage device, and shut down the processor in response to completing the data save operation.

11. The system of claim 10, wherein the data transfer kernel configures the processor for the data saving operation.

12. The system of claim 10, wherein the data transfer kernel configures the storage device for specialized data saving operations.

13. The system of claim 10, the data transfer kernel conducting a power down procedure.

14. A method for rapidly, deterministically saving data, the method comprising:
- detecting a data save condition that threatens the loss of data in a volatile memory;
- deterministically terminating all existing processes by rebooting a processor with a data transfer kernel loading a data save operation in the volatile memory and not loading and executing other processes in the volatile memory in response to rebooting the processor with the data transfer kernel, wherein the standard operating kernel marks the data in the memory to be saved by the data transfer kernel during the data save operation; and wherein rebooting the processor occurs without a loss of the data in the volatile memory;
- wherein the data transfer kernel exclusively supports devices, operations, and processes required to save data; and
- saving the data in the volatile memory to the non-volatile storage device using the data save operation; and
- shutting down the processor in response to completing the data save operation.

15. The method of claim 14, further comprising configuring the non-volatile storage device to receive the data.

16. A non-transitory computer readable storage medium storing a computer readable program code for rapidly, deterministically saving data, the program code:
- deterministically terminates all existing processes by rebooting a processor module with a data transfer kernel in response to an abnormal operating condition that threatens the loss of data stored in a volatile memory module, wherein the reboot occurs without a loss of data within the volatile memory module;
- load a data save operation in the volatile memory and executing other processes in the volatile memory in response to rebooting the processor module with the data transfer kernel;
- wherein the standard operating kernel marks the data in the memory to be saved by the data transfer kernel during the data save operation; and
- wherein the data transfer kernel exclusively supports devices, operations, and processes required to save data;
- transfers the data with the data save operation from the volatile memory module to a non-volatile storage device without a loss of data in the volatile memory module;

shuts down the processor module in response to completing the data save operation.

\* \* \* \* \*